(12) United States Patent
Greenwood

(10) Patent No.: US 6,328,325 B1
(45) Date of Patent: Dec. 11, 2001

(54) TEAMWORK AND STRENGTH TRAINING APPARATUS

(75) Inventor: Charles Greenwood, P.O. Box 1571, Cave Junction, OR (US) 97523

(73) Assignee: Charles Greenwood, Cave Junction, OR (US)

( * ) Notice: Subject to any disclaimer, the term of this patent is extended or adjusted under 35 U.S.C. 154(b) by 0 days.

(21) Appl. No.: 09/593,281

(22) Filed: Jun. 13, 2000

(51) Int. Cl.[7] .................................................. B62M 1/00
(52) U.S. Cl. ........................ 280/231; 280/222; 280/240; 280/244
(58) Field of Search ................................ 280/222, 226.1, 280/231, 244, 248, 247, 256, 257, 253, 266, 221, 232, 267, 87.042

(56) References Cited

U.S. PATENT DOCUMENTS

| | | | |
|---|---|---|---|
| 155,270 | * | 9/1874 | Thiessen ............................... 280/217 |
| 243,476 | * | 6/1881 | Vreeland .............................. 280/232 |
| 316,146 | * | 4/1885 | Hennig ................................. 280/231 |
| 397,015 | * | 1/1889 | McCoy ................................. 280/232 |
| 1,292,445 | * | 1/1919 | Drexler ................................ 280/220 |
| 1,418,817 | * | 6/1922 | Mack ................................... 280/232 |
| 1,503,878 | * | 8/1924 | Brady .................................. 280/230 |
| 3,174,767 | * | 3/1965 | Sendoykas ........................... 280/829 |
| 3,446,503 | * | 5/1969 | Lawton ................................. 482/96 |
| 3,690,697 | * | 9/1972 | Bohanski ............................. 280/247 |
| 4,700,962 | | 10/1987 | Salmon . |
| 4,743,010 | * | 5/1988 | Geraci ................................... 482/72 |
| 4,919,416 | * | 4/1990 | DeCloux ............................... 482/53 |
| 5,529,557 | * | 6/1996 | Barton .................................. 482/95 |
| 5,536,029 | | 7/1996 | Gramckow . |
| 5,580,340 | * | 12/1996 | Yu ........................................ 482/96 |
| 5,695,435 | * | 12/1997 | Dalebout et al. .................... 482/96 |
| 6,206,388 | * | 3/2001 | Ouboter ......................... 280/87.042 |

* cited by examiner

Primary Examiner—Christopher P. Schwartz
Assistant Examiner—David Divine
(74) Attorney, Agent, or Firm—ipsolon llp

(57) ABSTRACT

A wheeled vehicle having plural wheels referenced to a frame. The vehicle includes plural seats. Human power applied through handles and the seats converts and balances a first oscillatory motion along a first axis into rotational motion, while simultaneously converting oscillatory motion along a second axis into motion about an axis connected to a reference frame. The first oscillatory motion is output for useful work. The second oscillatory motion is used for vehicle control. The vehicle may be used in a stationary state as both a teamwork and physical-conditioning device and to generate power for useful work while the vehicle is stationary. Alternately, the power generated by the occupants may couple through a transmission to rotational motion to drive wheels, and thus to propel the vehicle. Precise steering control is provided for when the vehicle is being propelled.

20 Claims, 4 Drawing Sheets

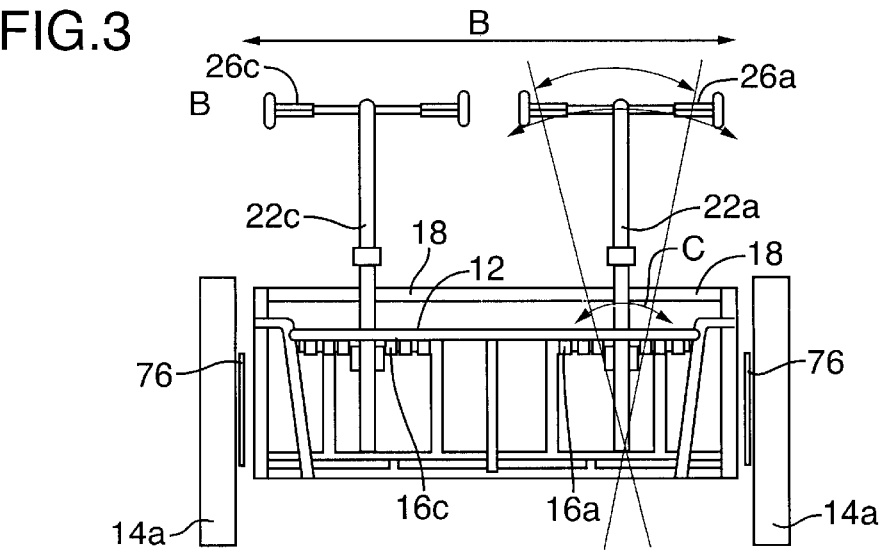
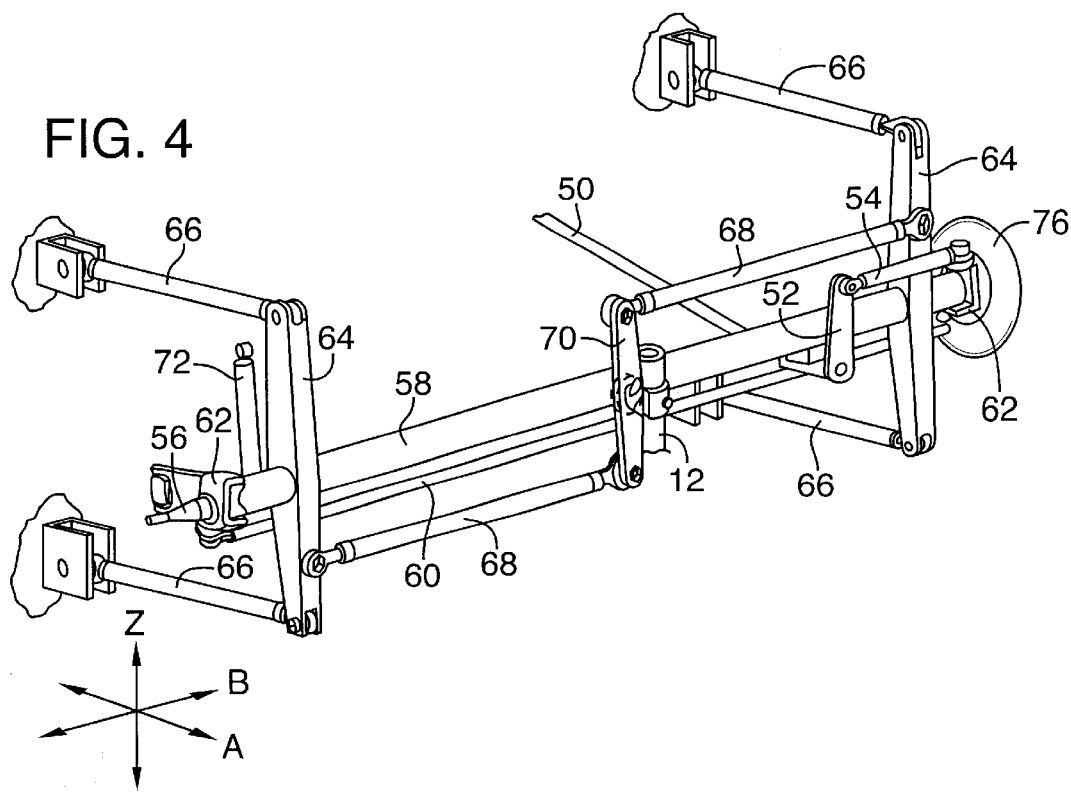

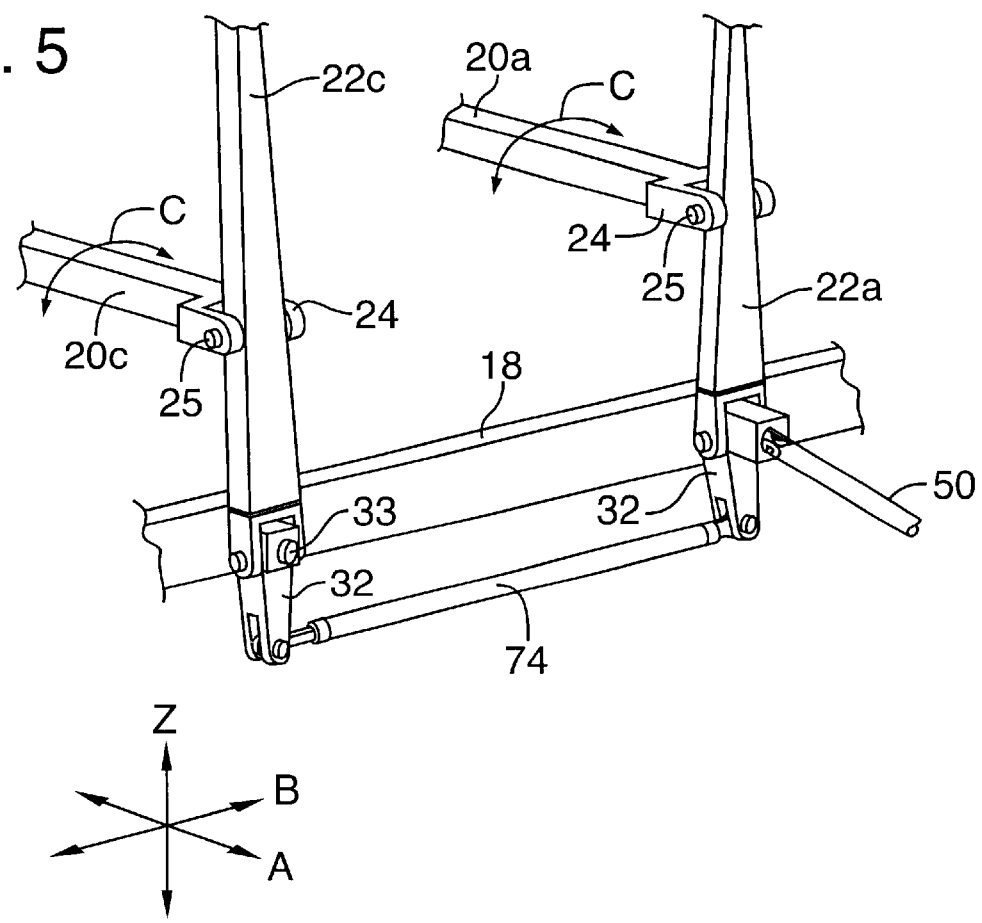

TEAMWORK AND STRENGTH TRAINING APPARATUS

FIELD OF THE INVENTION

This invention relates to a human-powered apparatus that converts oscillatory motion along one axis and from plural sources into rotational motion, and simultaneously converts oscillatory motion along a second axis into motion about an axis connected to a frame.

BACKGROUND OF THE INVENTION

In many fields of human endeavor it is known that a collection of individuals working together as a team are able to accomplish more work, more efficiently, than the same number of individuals performing the same tasks on an individual rather than a team basis. However, teamwork is a learned skill, both in terms of the general group behaviors required to function well as a team, and also in terms of the individual behaviors required in any specific team function. Teaching a group of individuals to perform at a maximum as a team requires specific training programs. In many instances physical-conditioning endeavors may be useful in teaching teamwork skills. There is always a continuing demand for methods and apparatus for teaching teamwork skills to groups of individuals.

Likewise, there is a wide demand for devices that aid in physical conditioning. While there are many hundreds of exercise machines on the market, there is always a demand for new strength training apparatus.

Human-powered vehicles may be used to teach teamwork skills, provide strength training, and to provide other tangible benefits. Human power may be used for many different purposes. These range from human-powered modes of transportation such as bicycles and the like, to human-powered apparatus used to generate secondary power such as emergency electrical generation equipment. The efficiency with which human power is converted to mechanical power can be measured in many different ways. For example, the efficiency with which a mechanical device, such as a bicycle, converts human power (measured in, for instance, wattage output) to mechanical power can be measured and quantified fairly easily and accurately. But as mechanical design takes into account principles of ergonomics, mechanical devices tend to be more "user friendly" and comfortable, which also makes their use more efficient. This is a more subjective but no less important measure of the "efficiency" of a power-converting device. But regardless of what yardstick is used to measure efficiency, it is true that the more efficiently human power output is translated into mechanical output, the less work the human has to perform to generate mechanical power.

Human-powered vehicles such as bicycles and many less traditional human-powered vehicles offer many benefits to their users. For instance, not only can such vehicles provide an efficient mode of transportation, but they can also be enjoyable as recreational devices. As energy resources, such as petrochemicals that are used to power internal combustion engines, become more and more scarce, alternate sources of transportation become more important. And the problems associated with environmental pollution need no explanation. Human-powered vehicles thus solve many of the problems associated with vehicles powered by internal combustion engines. There will always be a demand, therefore, for efficient and enjoyable vehicles that are powered by the people who ride them.

There are many, many types of bicycles and other human-powered vehicles. While most are designed for one or at most two riders, some have been designed for use by four and even more riders. But not all people who would like to use alternate transportation methods can ride bicycles. One example of a non-traditional human powered vehicle is described in U.S. Pat. No. 4,700,962. In the device disclosed in this patent, a rider's motion simulating rowing propels the vehicle described in this patent. The rowing motion applied to handles and a seat that moves longitudinally along a rail is translated through a chain and elastic cord arrangement into rotational motion that drives wheels. Directional control is supplied to a control wheel that is turned by lateral, side to side motion of the rider, which turns the control wheel with cables routed through various pulleys.

Yet another alternate vehicle that uses a rowing motion to provide rotational movement to drive wheels is illustrated in U.S. Pat. No. 5,536,029. The device of this invention uses a pair of reciprocating arms to power a drive mechanism. The arms are also coupled to a steering linkage such that they are used to steer the vehicle by tilting laterally from side to side.

While the vehicles described in these patents provides for forward motion as a result of a rowing motion, the vehicles are adapted for only one occupant and the drive mechanisms are fairly traditional.

The present invention relates to a wheeled vehicle that in a preferred embodiment is powered solely by its occupants, and which offers multiple advantages over known human-powered vehicles such as those described above. First, because only its riders, like bicycles may power the invention, it provides an alternative form of transportation compared to traditional vehicles that are powered by engines such as internal combustion engines. But unlike most bicycles, the vehicle of this invention allows for plural participants to combine their power output. Second, because in a preferred embodiment the vehicle needs no engine (other than the riders), the vehicle is non-polluting and relies only upon its riders for a power source rather than independent fuel sources. Third, because the occupants are able to propel the vehicle more efficiently when they work together as a team, the invention serves as a highly effective training apparatus that teaches behaviors that are necessary to effective group activity. Fourth, the invention provides an efficient method of providing physical conditioning.

The invention takes into account the fact that not all riders are physically capable of outputting the same amount of power. As such, each participant may contribute to the team effort according to his or her individual abilities. The power output of each participant is coupled with the power output by the others to provide efficient power pulses. Regardless of whether the vehicle uses the power of two, three, four or more occupants, each occupant participating in driving the vehicle typically must exert physical exercise, although even when one or more participants is participating passively the vehicle utilized that participant's mass to the benefit of the remaining team members. The invention is thus a strength and physical fitness-training device. Finally, the invention is an efficient means of ground transportation that relies upon novel mechanical features for efficient propulsion and control.

SUMMARY OF THE INVENTION

In a preferred embodiment, the invention is embodied in a vehicle having plural wheels referenced to a frame. The vehicle includes four seats, all or some of which may be occupied by participants. An arrangement of structural components are made to convert and balance a first oscillatory motion from plural human power sources along a first axis parallel to a longitudinal frame axis into rotational motion, while simultaneously converting oscillatory motion along a second axis into motion about an axis connected to a reference frame. The first oscillatory motion is converted to rotational motion that is output for useful work. The second oscillatory motion is used for control. The vehicle may be used in a stationary state as both a teamwork and physical conditioning device, and to generate power for useful work while the vehicle is stationary. Alternately, the power generated by the occupants may couple through a transmission to rotational motion to drive wheels, and thus to propel the vehicle. Precise steering control is provided for when the vehicle is being propelled.

Plural occupants may be seated in an all-facing-forward or backward arrangement, or any combination. The most efficient seating arrangement is with all participants in a back-to-back orientation, wherein each fore and aft pair of participants creates rotational power pulses that are balanced about a crankshaft. One front/back pair of occupants moves in unison in an oscillating motion and the adjacent front/back pair of occupants moves in an identical but offset or staggered oscillating motion to provide a balanced rotational power pulse without dead spots.

BRIEF DESCRIPTION OF THE DRAWINGS

The invention will be better understood, and the numerous objects and advantages of the invention will be apparent by reference to the following detailed description of the invention when taken in conjunction with the following drawings.

FIG. 3 is a left end elevational view of the "front" of the vehicle shown in FIG. 2.

FIG. 4 is a fragmentary, perspective detail view of a preferred embodiment of the steering assembly of the vehicle of FIG. 1.

FIG. 5 is a fragmentary, perspective detail view of an optional steering linkage assembly.

DETAILED DESCRIPTION OF PREFERRED EMBODIMENTS

The various structural components of the invention will be described first, and the operational aspects of the invention will then be described.

Figure 1:
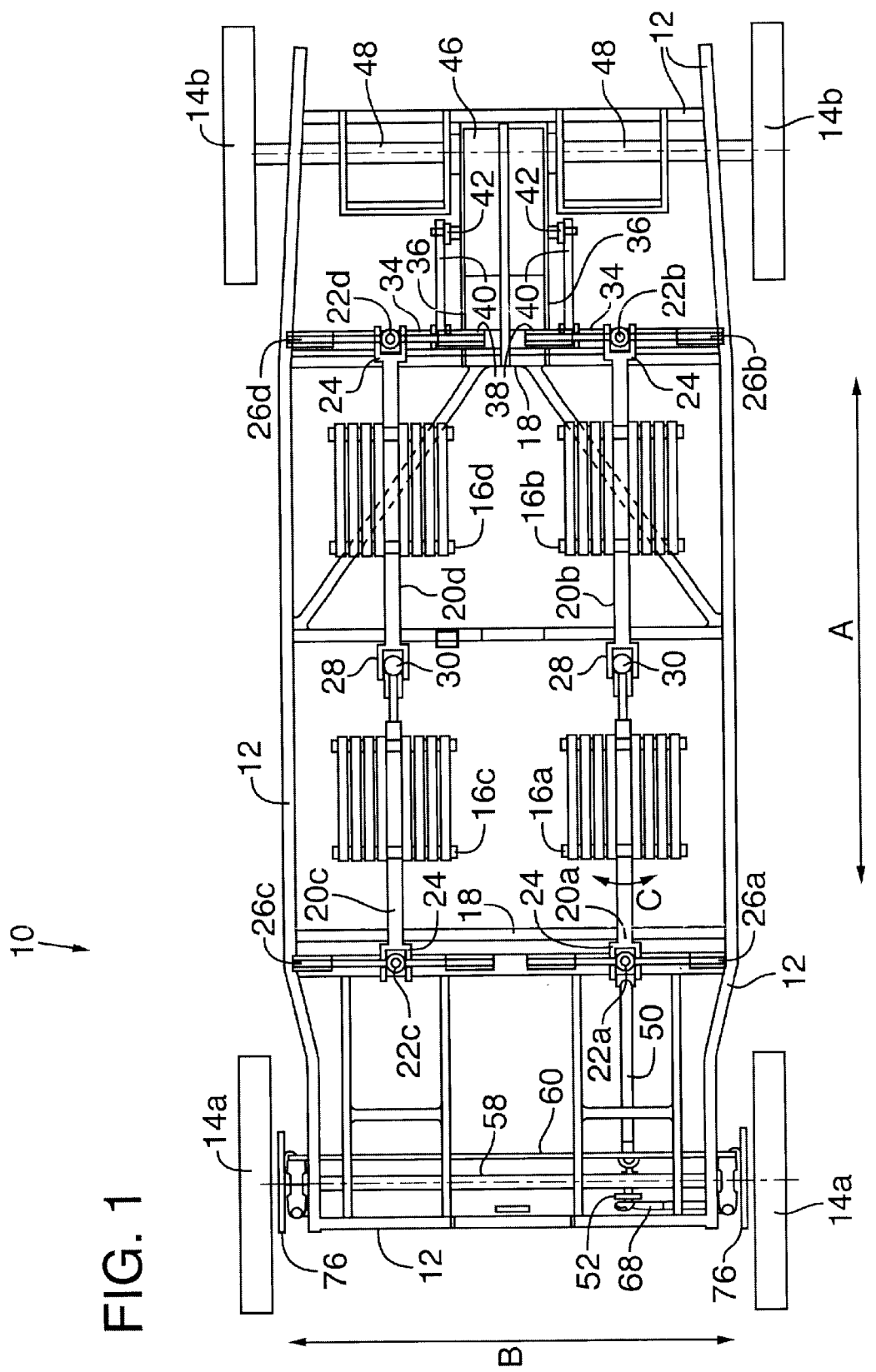
FIG. 1 is a top plan view of a preferred embodiment of the present invention, illustrating the invention as a vehicle equipped with wheels, which is one possible mode in which the invention may be used.

With reference to FIG. 1, a vehicle 10 is shown as comprising plural frame members 12 that define a peripheral frame or chassis to which four wheels 14 are referenced. The pair of wheels 14a are connected to a steering linkage, described below, and thus defines the control wheels. For purposes of a naming convention herein, wheels 14a are at said to be at the "front" of the vehicle. The pair of wheels identified as 14b is connected to the driving mechanisms, which are described in detail below. Following the same naming convention, wheels 14b are at the "rear" of the vehicle. Also for reference, the longitudinal axis that extends along the frame from the front through the rear of vehicle 10 is referred to as the "frame axis" or "longitudinal frame axis."

Wheels 14 may be of any type appropriate for the intended use of vehicle 10. The wheels must of course be of sufficient strength to support the vehicle and the load it carries.

It will be appreciated from the description below that the present invention need not be embodied in a "vehicle." While the invention is shown in a preferred embodiment as including wheels that function to support the vehicle when it is being propelled, the wheels may be removed from the axles and the "vehicle" thus becomes a stationary apparatus, which as described below performs numerous functions. Similarly, the vehicle may be made stationary by placing it on blocks with the wheels attached but such that the wheels are not supporting the frame. Accordingly, the description of the invention as embodied in the form of a wheeled vehicle is for ease of reference only and should not otherwise limit the invention. With this as a background it will be appreciated that the word "vehicle" is used generally herein to define the multifunctional apparatus 10.

Frame members 12 define a peripheral frame or chassis that encloses plural seats 16 for human occupants, each seat defining a "place." In FIG. 1 there are four places, referenced 16a, 16b, 16c, and 16d. For ease of reference, the reference number 16a is arbitrarily assigned to the seat that corresponds to the "drivers" position in automobiles manufactured for example, for the U.S. market. This is the "pilot's" seat—the co-pilot will occupy the adjacent front seat 16c. It will be appreciated that in addition to frame members 12 that comprise the peripheral frame box, the frame includes several transverse frame members 18 that interconnect frame members 12 and which extend transverse to the longitudinal frame axis. Sufficient bracing frame members are included to assure frame strength without adding excessive weight (see FIGS. 1, 2, for example). The frame members may be fabricated from numerous materials such as steel or aluminum tubing, composite materials or other well-known materials. Moreover, the tubular frame members shown in the Figures may be at least partly replaced with structural skin-stressed panels, which provide a more complete enclosure for the occupants as well as decreased resistance to wind.

Each seat 16 is mounted on a seat tube 20 (labeled 20a, 20b, 20c and 20d corresponding to the associated seat 16 mounted on the tube), and is paired with another seat in a line along the frame axis (e.g., seats 16a and 16b, and seats 16c and 16d). The forward ends of seat tubes 20a and 20c terminate at U-shaped brackets 24 that are pivotally mounted to handle support members 22a and 22c, respectively. Handle supports 22 are adjustable in length to accommodate occupants of different size. Brackets 24 span the support members and are interconnected thereto with a removable pin 25 (shown in FIG. 5). Similarly, the rear ends of seat tubes 20b and 20d terminate in brackets 24 that are pivotally mounted in the same manner to handle support members 22b and 22d, respectively. It will be appreciated that each pair of forward and rearward seats (for instance, seats 16a and 16b) are mounted on a common seat tube defined by the combination of tubes 20a and 20b that move together along the frame axis, although tubes 20a and 20b are longitudinally joined at brackets 28.

Figure 2:
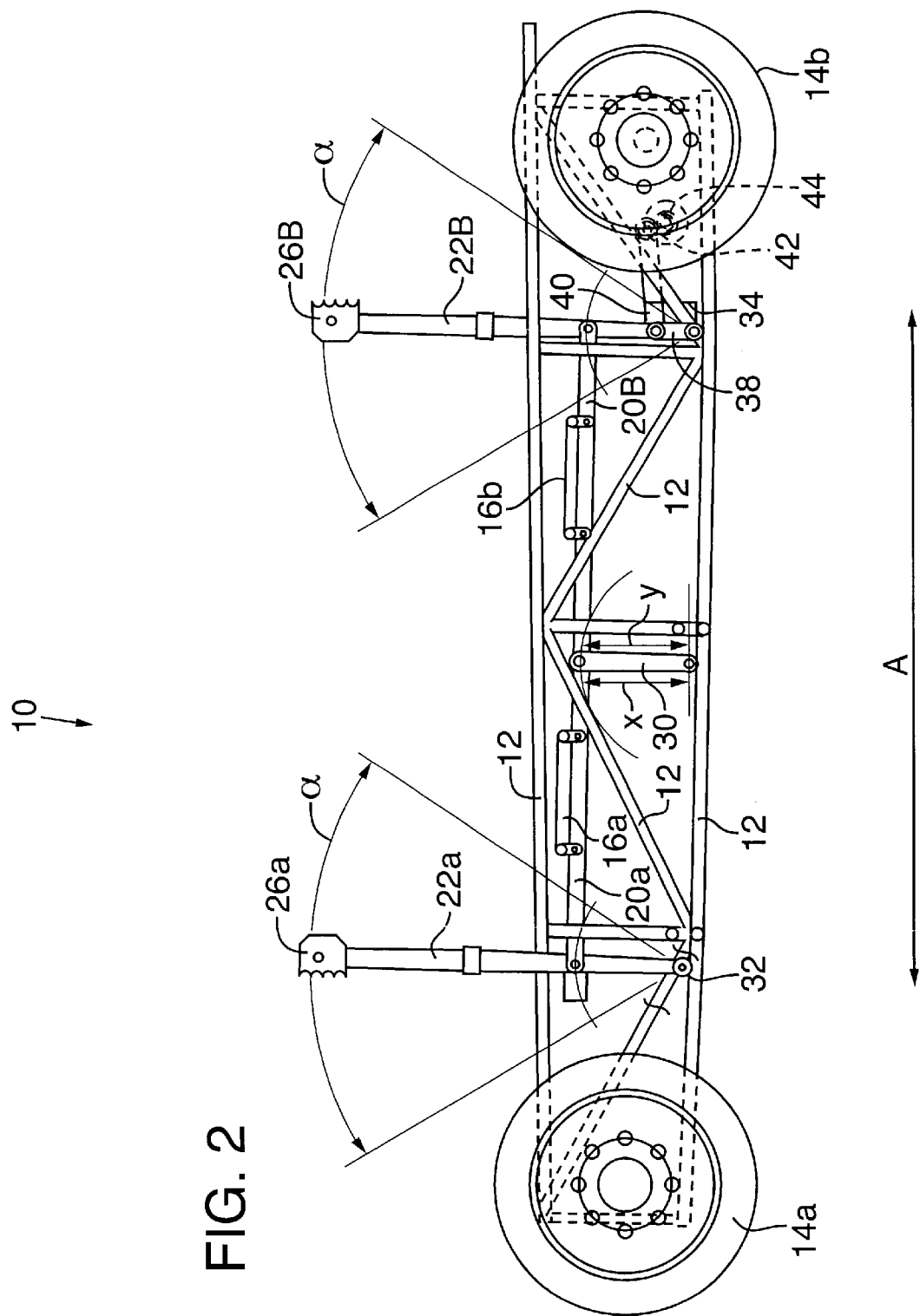
FIG. 2 is a side elevational view of the vehicle shown in FIG. 1.

A transverse drive handle 26 (26a, 26b, 26c and 26d) is mounted to the upper vertical end of each support member 22. The rearward end of seat tubes 20a and 20c are pivotally and independently interconnected to the respective forward ends of seat tubes 20b and 20d through the use of support idler arms 30. More specifically, the forward ends of seat tubes 20b and 20d are fitted with U-shaped brackets 28, which are pivotally mounted to idler arms 30 with a pin (not shown) that extends through the bracket and the idler arms. The rearward ends of seat tubes 20a and 20c are independently coupled to idler arms 30 with a spherical joint, as detailed below. Both the forward ends of tubes 20b and 20d, and the rearward ends of tubes 20a and 20c are independently adjustably connected to the idler arms and are capable of independent relative movement. With respect to the adjustable connections with the idler arms, the distance between the point at which idler arms 30 are pivotally connected to frame 12 and the point at which the support tubes are connected to the upper end of the idler arms may be varied by connecting the seat tubes to selected positions along the length of the idler. This variable positioning feature is shown in FIG. 2 with distance X, which represents the distance between the idler pivot point on the frame and the idler/seat tube 20a connection, and by distance Y, which is the distance between the idler pivot point and the idler/seat tube 20b connection. Since idler 30 oscillates back and forth about the idler pivot point as the seats move (detailed below), the distances X and Y define radii X and Y while the oscillatory motion is occurring. These radii may be independently adjusted as described above. The ratio of radius X to radius Y determines the travel length of the relative reciprocating movement of the seat tubes relative to one another.

Referring now to FIG. 2, the lower ends of the forward handle supports 22a and 22c are mounted to frame 12 with a gimbaled bracket 32 and longitudinally extending spindle 33 (see FIG. 5) such that the handles are pivotal about the attachment point at bracket 32 in an oscillatory motion along an axis parallel to the longitudinal frame axis, as indicated with arrow A in FIGS. 2. Moreover, as shown in FIG. 3, gimbaled bracket 32 allows front handle supports 22a and 22c (when 22c is coupled to 22a as described below) to pivot about the attachment point at bracket 32 in an oscillatory motion along an axis generally transverse to the longitudinal frame axis, as indicated with arrow B in FIGS. 1 and 3. As noted, gimbaled bracket 32 allows handle support 22a to pivot along an axis transverse to the frame axis. As described below, this pivoting motion provides steering control.

Rearward handle supports 22b and 22d are pivotally mounted to frame 12 such that the handles are movable about the attachment point in an oscillatory motion only along the longitudinal frame axis (arrow A in FIG. 2). The seat tubes are connected to the support handles at positions along the length of the support handles spaced from the attachment of the handles to the frame. The point of attachment of the seat tube to the handles is adjustable along the length of the handle with, for example, multiple attachment points for the attaching pins. The distance between the point that the seat tubes are attached to the handles and the pivot point of the handles at the frame is one factor that affects the forward-rearward arc through which the handles oscillate.

The lateral pivoting motion of the handle supports along axis B causes seat tube 20a to oscillate through an arc about the frame axis as support handle 22a pivots in the direction transverse to the frame axis (schematically shown by the curved arrow C in FIGS. 1, 3 and 5). As such, the interconnection of the rearward end of seat tube 20a to the forward end of seat tube 20b at bracket 28, which connects to the uppermost end of idler arm 30 as detailed above, must allow for seat tube 20a to rotate through this arc around the frame axis. This is preferably accomplished with a spherical joint such as a spherical rod end with appropriate bushings and/or roller bearings. The rearward end of seat tube 20c is connected to the forward end of seat tube 20d and idler arm 30 in the same fashion. The rearward seat tubes 20b and 20d do not oscillate through an arc about the frame axis as the forward seat tubes 20a and 20c oscillate or rock back and forth with the lateral motion of the handles or seats.

It will be appreciated, therefore, that given the interconnections of the seat tubes to the respective forward and rearward handle supports and the idler arms, front and rear pairs of seats are operable for forward and rearward oscillatory or reciprocating motion along the axis defined by arrow A. To provide flexibility and adjustment, the vertical length of handle supports 22 is adjustable. Moreover, the positions at which the seat tubes connect to the respective handle supports are preferably adjustable along the length of the supports to provide adjustment to accommodate for occupants of different sizes.

A rocker arm 34 is directly attached to each of the rearward support handles 22b and 22d at the lower end thereof and extends inwardly toward the center of the chassis and connects at its opposite end to transmission mounting bracket 36. As support handles 22b and 22d pivot along axis A between the forward and rearward extents of their strokes, each rocker arm 34 oscillates through the same arc. Each rocker arm 34 has standoffs 38 that are connected to connecting rods 40. Connecting rods 40 are connected at the opposite ends to crank arms 42, which drive a crankshaft 42 in a transmission 44. While not detailed, it will be understood that the connections between standoffs 38, connecting rods 40, crank arms 42 and crankshaft 44 are made with appropriate standard bearings as is well known to one skilled in the art. Oscillatory motion of handle supports 22 along the frame axis is translated through rocker arms 34 through the connecting rods into rotational movement of crankshaft 44.

Crankshaft 44 drives transmission 46. For purposes herein, transmission 46 may be mechanical, electrical or hydraulic or any combination. Transmission 46 allows for power from crankshaft 44 to be connected to output shafts 48 for useful work (for instance, driving wheels 14b or other useful stationary work). Transmission 46 is provided with control mechanisms to also allow power to be disconnected between one or two of the output shafts 48, or connected to the output shafts with release. Transmission 46 is preferably a constant mesh transmission having neutrals between gears to allow coasting, and such that if the rotational speed of the wheels is greater than the rotational speed of the crankshaft 44, then the transmission neutrals to eliminate feedback to the handles 26. As is well known in the art, output shafts 48 may be flexibly mounted to frame members 12. Rear wheels 14b may be mounted to the chassis with shock absorbing means such as hydraulic or mechanical shocks to dampen road vibrations in a standard manner.

The connecting linkage that translates the fore and aft oscillatory motion of the handle supports provides an efficient means of translating the oscillating motion into rotational motion. Other equivalent structural arrangements may be used to accomplish the same translation. For example, the output shafts could be powered with a traditional gear and derailleur mechanism borrowed from bicycles.

The steering linkage mechanisms of vehicle 10 are detailed in FIGS. 4 and 5. The steering linkages are necessary only for control of front wheels 14a when vehicle 10 is being used as a moving vehicle. As such, depending upon the intended use, the steering mechanisms described below are optional. Nonetheless, the steering mechanisms are useful in connection with teaching teamwork skills and may be used in that regard as well, even when vehicle 10 is stationary.

With reference to FIGS. 4 and 5, steering shaft 50 is flexibly coupled at its rearward end to gimbaled bracket 32. The forward or distal end of steering shaft 50 connects to a steering link arm 52 that is in turn connected with standard fittings to a steering rod 54. Front wheels 14a are mounted in standard ways to spindles 56 (only one of which is shown in the perspective view of FIG. 4) on opposite ends of front axle 58. A drag link 60 interconnects spindle brackets 62 to provide identical steering motion in each wheel. Axle towers 64 connect the forward ends of longitudinally adjustable locating rods 66 (for instance, rods fitted with turnbuckles). The opposite or rearward ends of locating rods 66 are connected to frame members 12. Similarly, longitudinally adjustable link rods 68 interconnect axle towers 64 with a link arm 70 that is coupled to frame 12. Locating rods 66 allow for precise wheel alignment and positioning along the A axis and link rods 68 allow for similar alignment and positioning of wheels 14a along the B axis. Standard shock absorbers 72 may be connected in standard manners to provide for dampening of road vibration.

An optional coupling link 74 is shown in FIG. 5. When coupling link 74 is connected as shown between gimbaled bracket 32 on handle support 22a and the opposed gimbaled bracket 32 on handle support 22c, both seat tubes 20a and 20c will be coupled such that they move side to side in unison as the handle supports pivot or oscillate along axis B.

Referring to FIG. 5 it may be seen that gimbaled bracket 32 allows for oscillatory movement of handle supports 32 along the axes defined by arrows A and B. Moreover, bracket 32 provides for limited relative movement between handle supports 22 and bracket 32 along the axis defined by arrow Z. This relative movement along axis Z provides a third degree of relative motional freedom at the interface of brackets 32 to handle supports 22.

Referring once again to FIG. 2 it may be seen that handle supports 22 oscillate back and forth along the frame axis A through an arc defined by angle α, which is set by and adjustable according to the relative lengths of standoffs 38 and crank arms 42. In the preferred embodiment angle α is about 60°, although in practice this angle may be varied according to preference of the participants. Turning to FIG. 3 it will be seen that handle supports 22 oscillate back and forth along axis B (transverse to the frame axis) through an arc defined by angle β. In the preferred embodiment angle β is about 15°, although again the angle may be varied in practice within limits imposed by the radius of the turning of control wheels 14a. The arc through which handle supports 22 oscillate along axis B is dictated by stops, which are not shown.

The steering linkage described above has been found to provide for precise directional control and is preferred. It will be understood, however, that other steering and control arrangements are well within the skills of those versed in the pertinent arts.

Operational characteristics of vehicle 10 will now be described in detail. In the preferred embodiment shown in the drawings vehicle 10 is shown with four places, one for each of four occupants. Although the apparatus may be operated with fewer than four participants, the most efficient operation is with four. The occupants normally are seated back-to-back. In other words, the "pilot" and the "co-pilot" are seated facing forward, and the occupants in the rearward seats (16b and 16d) are facing backward. This allows each occupant to operate the handle 26 associated with the seat. However, the relative positioning of the people in the seats may be varied as desired. The occupants' feet are placed on footrests (not shown) that are adjustably mounted to the frame.

The force applied by occupants' arms to handles 26, and the force applied by the occupants' legs to seats 16, causes the oscillatory back and forth motion of the seat tubes to be converted to rotational motion in crankshaft 44 through the mechanical coupling described above. This rotational motion about an axis that is transverse to the frame axis, and is translated through transmission 46 to output shafts 48 where it is converted into useful work. The paired seats 16a and 16b are connected to one another with common, interconnected seat tubes 20a and 20b, which are in turn connected to the respective handle supports and supported by idler arm 30. Both seats in this forward and aft pair are longitudinally interconnected and by the seat tube and oscillate in unison.

In order to provide for a rotational power pulse applied by adjacent pairs of occupants, the adjacent handles 26 are offset relative to one another. Stated otherwise, when for example the pilot's handle 26a is at the forward extent of the travel stroke and is just beginning the return stroke, the co-pilot's handle 26c is roughly in the middle of the forward travel stroke. The offset between these two adjacent handles may be widely varied (by varying the crank arm linkages), but is preferably around 30°. In other words, when support handle 22a is in the full forward position, the adjacent support handle 22c is offset from 22a by about 30°. However, essentially any offset will accomplish the goal of providing for a smooth power pulse. While forward and aft pairs of seats oscillate in unison because they are linked together through the connected seat tubes, adjacent pairs of seats oscillate in an offset or staggered relationship. This offset or staggered movement of one pair relative to the adjacent pair eliminates relative "dead spots" that could otherwise occur at the end of the strokes if all of the handles moved in unison, and thus provides for a maximum power stroke. This is the most efficient way to translate human power applied to the handles into rotational power applied to the output shafts. Moreover, different human participants will have different strengths and accordingly will output different amounts of power to the handles. The rotational power pulses provided by the described structure adds and sums the output power supplied by front-back pairs of participants (e.g., the occupants of seats 16a and 16b, and 16c and 16d, respectively), and most effectively balances the rotational power pulses about the crankshaft to provide smooth and continuous power output at shafts 48.

The back-and-forth motion of handles 26 and thus seats 16 along the longitudinal frame axis allows the human power applied in arm strokes to handles 26 to act in concert with human power applied in leg strokes to seats 16. Each motion is separately adjustable for flexibility, and to accommodate participants of different sizes and different strength abilities. The force applied to the handles and to the seats is multiplied by the stroke of each participant, creating continuous power so long as the oscillatory motion continues. As described above, the length of the radii defined by distances X and Y in FIG. 2 are separately adjustable. As such, idler arms 30 ratio and transfer the forces applied by the participants in proportion to the muscular and dimensional capability of each participant. In most cases the radius X will be less than the radius Y.

Simultaneously with the back-and-forth motion of the handles and the seats described above, one or both of the forward handles 26a and 26c may oscillate back and forth transverse to the frame axis to provide directional control to vehicle 10. The pilot in seat 16a (and the co-pilot in seat 16c if optional coupling link 74 is attached as described above) provide directional control to vehicle 10 by either leaning their bodies to one side or the other, or by pivoting the handles 26 one way or the other (or combining these motions). These motions apply directional control to front wheels 14a through the steering linkages described above. The driver therefore controls the directional control of vehicle 10 by rocking his or her seat laterally from one side to the other, thereby activating the steering linkage. The directional control of the vehicle may be controlled by the driver in a hands-free motion, simply by rocking the seat one way or another.

It may be seen therefore that vehicle 10 allows for a conversion and balancing of oscillatory motion along a first axis (A) provided from plural human sources into rotational motion that may be converted to useful work, while simultaneously converting oscillatory motion along a second axis (B) into a control function.

As noted above, the present invention may be used as a tool for teaching and reinforcing teamwork skills, as a strength-training device, and as a means of transportation. Each of these functions may be accomplished with the vehicle fitted with wheels, as described above, or with the vehicle adapted to be stationary. Teamwork skills are readily taught because each participant (regardless of how many are involved) must work together with other participants to provide the most efficient motion and power transmission. Hierarchical ranking concepts may also be taught and reinforced because the participants must cooperate with the pilot, who has directional control (and with the co-pilot when seat 16c is coupled with coupling link 74) and thus is the dominant or controlling participant. Strength training is an obvious benefit since human power output is required to drive output shafts 48.

While it is naturally preferred that each occupant supply physical power, in some instances one or more participants may be entirely passive. The passive occupant's' weight, which in this case is essentially dead weight, is nonetheless converted to useful output when coupled with an adjacent participating participant (not back-to-back) through the oscillating flywheel effect that results from the structure described. In other words, with adjacent pairs of seats moving through fore and aft strokes in a staggered manner, the "dead weight" of the passive participant provides momentum through the middle run of the stroke, which is converted to angular momentum at the ends of the stroke.

From the foregoing description it will be appreciated that the frame or chassis provides a relatively safe enclosure for the occupants. This permits the vehicle to compete for road space with more traditional vehicles so long as the performance of the vehicle allows it to adequately perform relative to powered vehicles. Such automobile-equivalent performance characteristics may be provided by combining the human power sources with other, supplemental power sources such as traditional internal combustion engines.

Various additions and modifications may be made to vehicle 10. For instance, although not detailed, brakes are included for obvious reasons. In the preferred embodiment at least the front wheels 14a are fitted in known manners with discs 76 and hydraulic calipers (not shown) that are activated with, for example, hand or foot actuators accessible to one or more occupants (preferably at least the pilot in seat 16a). As noted above, other additions include external structural panels covering the frame to provide for decreased wind resistance and to provide an enclosure for the occupants. Further, while in the preferred embodiment vehicle 10 has four places, the concepts of the invention apply to vehicles having fewer than four and greater than four places. Likewise, the vehicle is operable and may be configured with fewer than the preferred four wheels, such as one front control wheel. Moreover, both the front and rear axles may be made to a standardized track width so that flanges may be added to the insides or outsides of each wheel. This would allow the vehicle to safely interface with a suitable width rail track. Finally, as noted, independent power sources may be combined with the human power to provide for a vehicle having multiple power sources. Other modifications will be within the skill of those of ordinary skill in the art.

While the present invention has been described in terms of the best mode of a preferred embodiment, it will be appreciated by one of ordinary skill that the spirit and scope of the invention is not limited to those embodiments, but extend to the various modifications and equivalents as defined in the appended claims.

I claim:

1. A human-powered vehicle, comprising:
   a chassis defining a longitudinal axis;
   plural pairs of seats for seating plural occupants, each pair of seats defined by a fore seat and an aft seat, each fore seat mounted on a fore seat tube and each aft seat mounted on an aft seat tube, and each aft seat tube connected along said longitudinal axis to an associated fore seat tube to define a common seat tube for each pair of seats, each common seat tube having a forward end and a rearward end;
   an idler supporting each common seat tube between said forward and rearward ends, each idler pivotally connected to said chassis;
   a pair of handles associated with each common seat tube, each handle pivotally mounted to said chassis for oscillating in a fore and aft stroke along said longitudinal axis and one handle in each pair interconnected with and supporting the forward end of said common seat tube and the other handle in each pair interconnected with and supporting the rearward end of said common seat tube such that oscillation of said handles oscillates said seats along said longitudinal axis;
   means for translating said oscillation of said handles into rotational movement.

2. The vehicle of claim 1 wherein said chassis is supported by a plurality of wheels for rolling movement and wherein said rotational movement drives at least one of said wheels.

3. The vehicle of claim 2 wherein said plurality of wheels includes at least one control wheel operable for directional control of said vehicle.

4. The vehicle of claim 2 including a pair of drive wheels and a pair of control wheels.

5. The vehicle of claim 4 wherein at least one of said handles is pivotally mounted to said chassis for oscillating movement along an axis transverse to said longitudinal axis and wherein said transverse oscillating movement is operable for said directional control of said vehicle.

6. The vehicle of claim 5 including steering linkage including a steering link arm interconnecting said handle to said control wheels.

7. The vehicle of claim 5 wherein said steering link arm is connected to a link rod connected to a first of said control wheels and wherein said wheels are interconnected with a second rod such that control movement of said first wheel causes like control movement of said second wheel.

8. The vehicle of claim 1 wherein one of said handles is connected to said chassis at a gimbal that simultaneously permits said handle to oscillate along said longitudinal axis and along a second axis transverse to said longitudinal axis.

9. The vehicle of claim 8 including plural wheels attached to said chassis such that oscillation of said handles along said longitudinal axis causes rotational movement of at least one wheel to propel said vehicle, and oscillation of said handle along said second axis causes directional movement of at least one wheel to cause directional control of said vehicle as it is propelled.

10. The vehicle of claim 1 wherein each fore seat tube and each connected aft seat tube in a pair are independently and adjustably connected to and supported by said idler.

11. The vehicle of claim 1 including at least two pairs of paired seats arranged laterally adjacent one another, and wherein said laterally adjacent pairs oscillate along said longitudinal axis through fore and aft strokes offset relative to one another.

12. Apparatus for teaching teamwork concepts to human occupants, comprising:

a frame defining a frame axis;

at least one pair of seats aligned along the frame axis, to define a forward seat and a rearward seat for each pair, and each pair mounted on a common seat tube having a forward end and a rearward end;

a handle connected to the forward end of said common seat tube to define a forward handle and a handle connected to the rearward end of said common seat tube to define a rearward handle, each handle pivotally coupled to said frame for oscillating movement in a fore and aft stroke, wherein said oscillating movement causes each seat in a pair to move fore and aft relative to said frame in unison;

wherein said forward handle is gimbaled to said frame to permit side to side lateral oscillatory movement of said handle relative to said frame axis.

13. The apparatus of claim 12 including a translational member attached to at least one rearward handle and operable for converting said oscillating movement into rotational movement about an axis transverse to said frame axis.

14. The apparatus of claim 13 including plural wheels referenced to said frame for supporting said frame in a rolling motion and wherein said plural wheels include a pair of drive wheels connected to said translational member and a pair of control wheels.

15. The apparatus of claim 14 wherein said control wheels are linked to said at least one forward handle such that said lateral oscillatory movement of said handle moves said control wheels.

16. The apparatus of claim 15 including plural pairs of seats and wherein each pair of seats oscillates along said frame axis.

17. The apparatus of claim 16 wherein each pair of seats oscillates out of unison with an adjacent pair of seats.

18. The apparatus of claim 16 including a link arm interconnecting said at least one forward handle and a second forward handle, and wherein said second forward handle is gimbaled to said frame to permit side to side lateral oscillatory movement relative to said frame axis in unison with said at least one forward handle.

19. A human powered vehicle, comprising:

a frame defining a frame axis;

at least four wheels attached to the frame for supporting and rolling said frame;

at least two pairs of seats, each pair defined by a forward seat and a rearward seat and each seat in a pair mounted to a common seat tube that interconnects each seat in the pair along said frame axis, and each pair oriented adjacent the other pair to define at least two forward seats and a like number of rearward seats;

an idler arm for each common seat tube, one idler connected to and supporting each common seat tube and configured for variable positioning of the location of the connection of said seat tube along the length of said idler arm;

a handle for each seat, each handle for each rearward seat connected to the seat tube associated with said rearward seat and each of said handles pivotally mounted to said frame for pivotal oscillating movement of said handles and said seats along said frame axis, and each handle for each forward seat connected to the seat tube associated with said seat and each of said handles mounted to said frame for pivotal oscillating movement along said frame axis and along a second axis transverse to said frame axis;

whereby the oscillating movement of said seats along said frame axis drives one or more of said wheels and oscillating movement of said handles along said second axis causes two of said wheels to exert directional control over said vehicle during said rolling movement.

20. The vehicle according to claim 19 wherein said oscillating movement of said handles along said second axis may be induced by lateral tipping of said forward seats but not by tipping of said rearward seats.

\* \* \* \* \*